US011460823B2

(12) United States Patent
Abe

(10) Patent No.: US 11,460,823 B2
(45) Date of Patent: Oct. 4, 2022

(54) CONTROL SYSTEM, MUTUAL EXCLUSION METHOD, AND SUBJECT DEVICE

(71) Applicant: OMRON CORPORATION, Kyoto (JP)

(72) Inventor: Ryosuke Abe, Ritto (JP)

(73) Assignee: OMRON CORPORATION, Kyoto (JP)

( * ) Notice: Subject to any disclaimer, the term of this patent is extended or adjusted under 35 U.S.C. 154(b) by 347 days.

(21) Appl. No.: 16/645,517

(22) PCT Filed: Nov. 1, 2018

(86) PCT No.: PCT/JP2018/040717
§ 371 (c)(1),
(2) Date: Mar. 9, 2020

(87) PCT Pub. No.: WO2019/088226
PCT Pub. Date: May 9, 2019

(65) Prior Publication Data
US 2020/0278654 A1    Sep. 3, 2020

(30) Foreign Application Priority Data

Nov. 2, 2017 (JP) .............................. JP2017-212834

(51) Int. Cl.
*B65H 1/02* (2006.01)
*G05B 19/05* (2006.01)
*H02P 29/00* (2016.01)

(52) U.S. Cl.
CPC ......... *G05B 19/058* (2013.01); *G05B 19/056* (2013.01); *H02P 29/00* (2013.01)

(58) Field of Classification Search
CPC ..... G05B 19/058; G05B 19/056; H02P 29/00; B65H 1/02
See application file for complete search history.

(56) References Cited

U.S. PATENT DOCUMENTS

| 2007/0086049 | A1  | 4/2007 | Lee et al. |
| 2008/0229406 | A1  | 9/2008 | Go |
| 2017/0261955 | A1* | 9/2017 | Ushiyama ............ G05B 19/042 |

FOREIGN PATENT DOCUMENTS

| JP | H11-032449 A | 2/1999 |
| JP | 2007-115253 A | 5/2007 |

(Continued)

OTHER PUBLICATIONS

An English translation of the International Search Report("ISR") of PCT/JP2018/040717 dated Jan. 29, 2019.

(Continued)

*Primary Examiner* — Cortez M Cook
(74) *Attorney, Agent, or Firm* — Metrolex IP Law Group, PLLC

(57) ABSTRACT

Provided is a subject device comprising: a control permission issuance part for issuing a new control permission each time a control permission issuance request is received from any of a plurality of control devices, and for returning information of the new control permission to the control device having transmitted the issuance request; a control permission management part for managing the control permissions such that only one among the issued control permissions is valid and the other issued control permissions are invalid; and a mutual exclusion part for, upon receipt, from any of the plurality of control devices, of a control commencement request to which the information of the control permission has been appended, verifying whether the control permission appended to the control commencement request is valid, allowing exclusive control by the control device having transmitted the control commencement request if the control permission is valid, and denying control by the control device having transmitted the control commencement request if the control permission is invalid.

7 Claims, 5 Drawing Sheets

(56) References Cited

FOREIGN PATENT DOCUMENTS

| | | |
|---|---|---|
| JP | 2015-176319 A | 10/2015 |
| JP | 2017-163758 A | 9/2017 |
| WO | WO-2008060480 A3 * 12/2008 | ............... B65H 1/02 |

OTHER PUBLICATIONS

An English translation of the Written Opinion("WO") of PPCT/JP2018/040717 dated Jan. 29, 2019.

* cited by examiner

CONTROL SYSTEM, MUTUAL EXCLUSION METHOD, AND SUBJECT DEVICE

CROSS REFERENCE TO RELATED APPLICATIONS

This application is based upon and claims the benefit of priority of the prior Japanese Patent Application No. 2017-212834, filed on Nov. 2, 2017, and International Patent Application No. PCT/JP2018/040717, filed on Nov. 1, 2018, the entire contents of which are incorporated herein by reference.

TECHNICAL FIELD

The present invention relates to a technique for mutual exclusion in a control system.

BACKGROUND ART

In the field of factory automation (FA), automatic control on production equipment in a factory is implemented by a control system including a control device such as a programmable logic controller (PLC) and a to-be-controlled device such as a driver, a sensor, or an I/O. The control device and the to-be-controlled device are connected over a dedicated bus or an industrial network. As the industrial network, Industrial Ethernet to which the technology of Ethernet (registered trademark) is applied has been widely used, and EtherCAT (registered trademark) promoted by EtherCAT Technology Group (ETG) is also an implementation of the industrial network.

To such an industrial network, a master-slave system is generally applied in order to guarantee real-time communication and reliability. In such a master-slave system, one control device serving as a master sends a control command, and a to-be-controlled device (serving as a slave) connected to the master operates in accordance with the control command received from the master. Patent Literature 1 discloses an industrial Ethernet to which the master-slave system is applied.

CITATION LIST

Patent Literature

Patent Literature 1: JP 2015-176319 A

SUMMARY OF INVENTION

Technical Problem

Communication based on the master-slave system allows only one master to generate and send the control command. Therefore, a situation where the slave receives the control command separately from each of a plurality of masters cannot happen by nature.

However, a case where two or more control devices are temporarily connected over the network during, for example, a control program development process, test run, or maintenance is conceivable. Further, the possibility that two or more control devices are accidentally connected to the network cannot be denied. If a plurality of control devices are present on the network and individually send the control command to the same slave, it may lead to a malfunction or failure of the slave.

The present invention has been made in view of the above circumstances, and it is therefore an object of the present invention to provide a technique for implementing, in a simple manner, mutual exclusion in a subject device to be controlled, in a control system where a plurality of control devices capable of sending a control command to the subject device are connected.

Solution to Problem

Provided according to a first aspect of the present invention is a control system including a subject device to be controlled, and a plurality of control devices connected to the subject device over a network. In the control system, the subject device includes a control permission issuance part configured to issue a new control permission each time a control permission issuance request is received from any of the plurality of control devices and return information on the new control permission to the control device that has sent the control permission issuance request, a control permission management part configured to execute control permission management to validate only one of already-issued control permissions and invalidate a remaining control permission, and a mutual exclusion part configured to, upon receiving a control start request to which information on a control permission is attached from any of the plurality of control devices, check whether the control permission attached to the control start request is valid, permit, when the control permission is valid, exclusive control by the control device that has sent the control start request, and reject, when the control permission is invalid, control by the control device that has sent the control start request.

With this configuration, the subject device issues the "control permission" to the control device and manages the already-issued control permissions to keep only one control permission valid at all times. Then, upon receiving the control start request from the control device having the valid control permission, the subject device permits exclusive control by the control device. Therefore, even when a plurality of control devices are present on the network and individually and randomly (that is, without any arbitration between the control devices) send the control permission issuance request or the control start request to the subject device, it is guaranteed that only one control device having the valid control permission is permitted to control the subject device. This allows mutual exclusion on the subject device. Further, a method according to the present invention is applicable without the need for a control device side (a side that sends the control command) to check for the presence or absence of other control devices or to make arbitration with the other control devices and irrespective of the number of control devices or network topology, and thus the method has the advantage of implementing, in a simple manner, mutual exclusion in the subject device.

The control permission management part of the subject device may execute the control permission management to validate only the latest control permission of the already-issued control permissions and invalidate a control permission issued before the latest control permission.

This configuration allows management of validity/invalidity of the control permission to be implemented with very simple logic in which the other control permission is invalidated each time a new control permission is issued.

With the exclusive control by any of the control devices permitted, the control permission issuance part of the subject device need not issue a new control permission until the exclusive control by the control device is terminated. Further, with the exclusive control by any of the control devices permitted, while the exclusive control by the control device is in execution, the information on the control permission issued to the control device may be attached to a message sent from the control device to the subject device. This makes it possible to prevent the occurrence of interruption or congestion by other control devices while the control by the control device is in execution.

The subject device may be a driver configured to drive an actuator, and the control device may be a PLC or a computer configured to send the control command to the driver. If the plurality of control devices individually give the control command to the driver configured to drive the actuator, it may lead to a malfunction of or excessive load on the actuator and in turn lead to a failure of the actuator or a failure of production equipment. Therefore, applying the mutual exclusion according to the present invention to such a subject device is very effective. Examples of the actuator include a motor, a linear guide, and the like, and examples of the driver include an inverter, a servo driver, and the like.

The network may be an industrial network. Examples of the industrial network (also referred to as a field network) include Industrial Ethernet, and examples of Industrial Ethernet include EtherCAT. Note that the network of the plurality of control devices and the subject device has any architecture and topology.

Provided according to a second aspect of the present invention is a mutual exclusion method implemented in a control system including a subject device to be controlled, and a plurality of control devices connected to the subject device over a network. The mutual exclusion method includes causing the subject device to issue a new control permission each time a control permission issuance request is received from any of the plurality of control devices and return information on the new control permission to the control device that has sent the control permission issuance request, causing the subject device to execute control permission management to validate only one of already-issued control permissions and invalidate a remaining control permission, and causing the subject device to, upon receiving a control start request to which information on a control permission is attached from any of the plurality of control devices, check whether the control permission attached to the control start request is valid, permit, when the control permission is valid, exclusive control by the control device that has sent the control start request, and reject, when the control permission is invalid, control by the control device that has sent the control start request.

Provided according to a third aspect of the present invention is a subject device that operates in accordance with a control command from a control device and to which a plurality of the control devices are connected over a network. The subject device includes a control permission issuance part configured to issue a new control permission each time a control permission issuance request is received from any of the plurality of control devices and return information on the new control permission to the control device that has sent the control permission issuance request, a control permission management part configured to execute control permission management to validate only one of already-issued control permissions and invalidate a remaining control permission, and a mutual exclusion part configured to, upon receiving a control start request to which information on a control permission is attached from any of the plurality of control devices, check whether the control permission attached to the control start request is valid, permit, when the control permission is valid, exclusive control by the control device that has sent the control start request, and reject, when the control permission is invalid, control by the control device that has sent the control start request.

Note that the present invention can be considered as a subject device or a control system having at least some of the above configuration. Further, the present invention can be considered as a mutual exclusion method implemented in the control system or a mutual exclusion method implemented in the subject device, the mutual exclusion method including at least some of the above processes. Further, the present invention can also be considered as a program for causing a processor implemented in the subject device to execute the mutual exclusion method or a non-transitory computer-readable recording medium in which such a program is recorded. The above configurations and processes may be combined with each other to constitute the present invention as long as no technical contradiction occurs.

Advantageous Effects of Invention

According to the present invention, it is possible to implement, in a simple manner, mutual exclusion in the subject device to be controlled, in the control system where the plurality of control devices capable of sending the control command to the subject device are connected.

DESCRIPTION OF EMBODIMENT

The present invention relates to mutual exclusion that allows, with a plurality of control devices capable of sending a control command to a subject device to be controlled connected, only one of the plurality of control devices to exclusively control the subject device. The present invention is preferably applicable to a control system where control by one control device needs to be guaranteed. Examples of such a control system include a control system for controlling FA production equipment. Therefore, a description will be given below of an example of mutual exclusion in a control system including a PLC and a driver of an actuator as a preferred embodiment according to the present invention. However, the following embodiment is merely one of preferred application examples of the present invention and is not intended to limit the scope of the present invention only to the preferred application examples.

(System Configuration)

Figure 1:
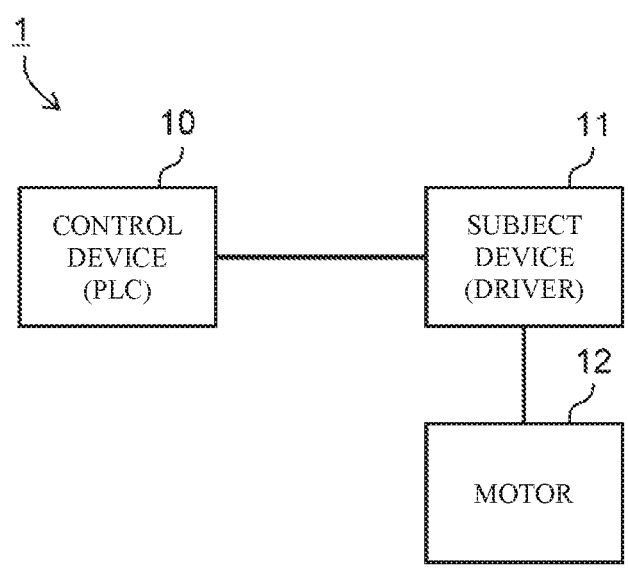
FIG. 1 is a diagram showing an example of a configuration of a control system.

FIG. 1 shows a physical configuration of a control system according to the present embodiment. The control system 1 includes a PLC 10 as a control device and a driver 11 as a subject device. The PLC 10 and the driver 11 are connected over EtherCAT, one of the industrial networks, where a control command is transferred on the basis of master-slave communication where the PLC 10 serves as a master and the driver 11 serves as a slave. The driver 11 is a device, specifically an inverter or a servo driver, configured to drive a motor 12.

Note that only one subject device is shown in FIG. 1 for convenience of description, but a plurality of subject devices may be connected to the PLC 10. Such a configuration allows mutual exclusion (to be described later) to be applied to each of the subject devices. Examples of the subject device include an I/O unit, a switch, a sensor, a relay, and a valve, in addition to the driver. A connection between the PLC 10 and the subject device may be established on a network other than EtherCAT, or a wireless network rather than a wired network.

In actual operation, the PLC 10 serving as a master sends a frame (a data block as a unit of data communication) containing the control command to the network at regular intervals. This frame is looped back to the PLC 10 serving as a master after sequentially going through all slaves connected to the network. Upon receiving the frame, each slave fetches the control command that is contained in the frame and addressed to the slave and executes a process in accordance with the control command Such a mechanism enables real-time control based on the control command from a master.

(Exceptional Configuration)

Such master-slave communication is based on the premise that only one master is present on the network as shown in FIG. 1. However, an exceptional case where a plurality of control devices (that is, devices capable of serving as masters) capable of sending the control command to the slave are connected to the network is conceivable. For example, during a process of developing or debugging a control program to be installed in the PLC 10 or in order to perform a test run or maintenance of the system, a person in charge of development or maintenance of the system or the like may temporarily connect, to the network, a PLC for use in test or a terminal for use in development and maintenance. Such a terminal for use in development and maintenance is a general-purpose computer such as a personal computer (laptop personal computer), a tablet terminal, or a smartphone having an application program for use in development and maintenance installed therein, and the terminal for use in development and maintenance is capable of, for example, updating a PLC control program, sending the control command to the slave, performing a test run of the slave and updating a parameter of the slave, and the like. Further, in addition to the above case, the person in charge of development or maintenance of the system or the like may erroneously connect two or more control devices to the network.

Figure 2A:
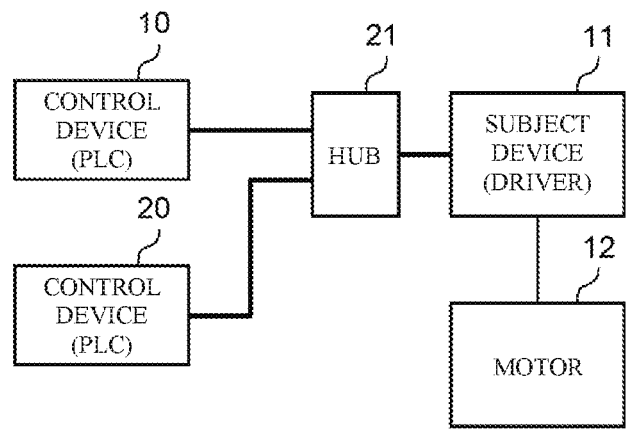
FIGS. 2A to 2C are diagrams each showing a configuration where a control device is added to the configuration shown in FIG. 1.
Figure 2B:
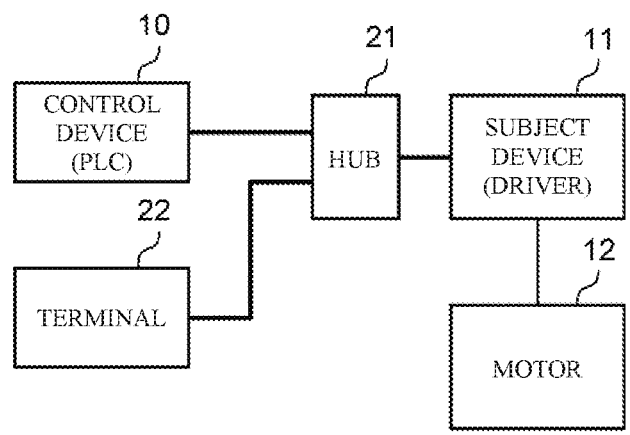
Figure 2C:
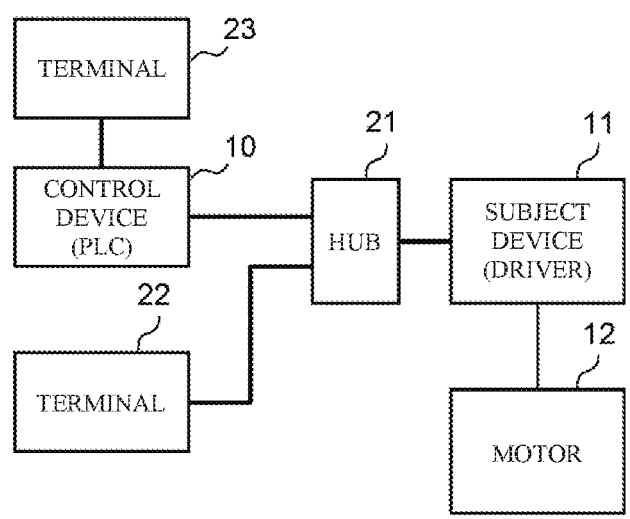

FIG. 2A shows an example where a PLC 20 for use in test is added to the control system shown in FIG. 1. Two PLCs 10 and 20 are connected to the driver 11 via a hub 21. In this example, both the two PLCs 10 and 20 can serve as masters. FIG. 2B shows an example where a terminal 22 for use in development and maintenance is added to the control system shown in FIG. 1. In this example, both the PLC 10 and the terminal 22 can serve as masters. FIG. 2C shows an example where a terminal 23 for use in development and maintenance is connected to the PLC 10 shown in FIG. 2B. In this case, the terminal 23 operates as one master in cooperation with the PLC 10. Therefore, in this example, both the terminal 22 and the terminal 23 can serve as masters. Note that FIGS. 2A to 2C merely show examples of the configuration where a plurality of masters are present on a network, and other configurations are also possible. Needless to say, a configuration where three or more masters are present is also possible.

With a configuration where a plurality of masters are present on a network as shown in FIGS. 2A to 2C, when the masters individually send the control command to the driver 11, it may lead to a malfunction or failure of the driver 11 or the motor 12. In order to solve such a problem, the driver 11 executes mutual exclusion so as to accept control from only one of the masters. A description will be given below of a configuration related to mutual exclusion in the subject device such as the driver 11.

(Configuration Related to Mutual Exclusion)

Figure 3:
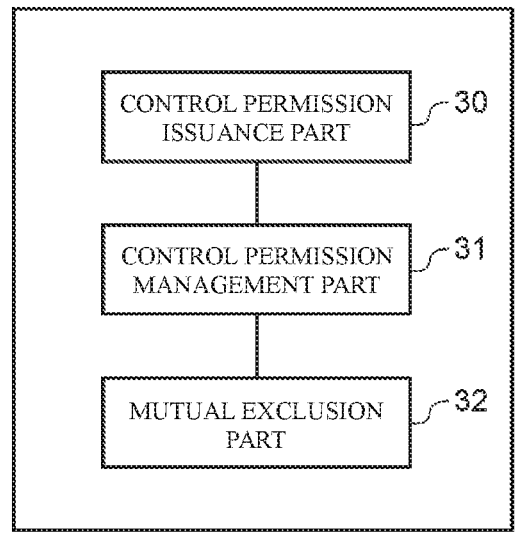
FIG. 3 is a block diagram showing a configuration related to mutual exclusion in a subject device.

FIG. 3 is a block diagram schematically showing a configuration related to mutual exclusion implemented in the subject device according to the present embodiment. As shown in FIG. 3, the subject device includes a control permission issuance part 30, a control permission management part 31, and a mutual exclusion part 32. The control permission issuance part 30 is a module configured to issue a control permission to the control device (master). The control permission management part 31 is a module configured to manage validity/invalidity of the control permission thus issued. The mutual exclusion part 32 is a module configured to execute mutual exclusion using the control permission. Specific functions and operations of the modules will be described later.

The subject device includes a control circuit including a CPU (processor), a memory, a storage device, and the like. According to the present embodiment, the CPU loads a program stored in the storage device into the memory and run the program to put each of the modules shown in FIG. 3 into operation. However, all or some of the modules shown in FIG. 3 may be implemented with a circuit (hardware) such as an ASIC or an FPGA.

Figure 4:
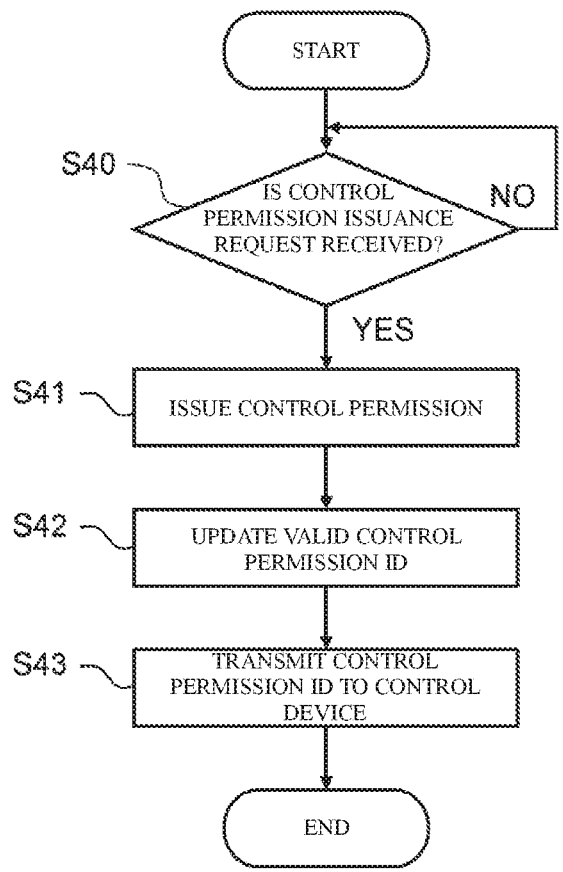
FIG. 4 is a flowchart showing a control permission issuance process.

FIG. 4 is a flowchart showing a control permission issuance process executed by the control permission issuance part 30 and the control permission management part 31. According to the present embodiment, when the control device (master) desires exclusive control on the subject device (slave), the control device first generates a frame representing a "control permission issuance request" addressed to the subject device and sends the frame to the network.

Upon receiving the "control permission issuance request" from any control device (master) over the network (step S40), the control permission issuance part 30 of the subject device issues a new control permission (step S41).

The "control permission" is a permission that can request the subject device (slave) to start exclusive control. In order to prevent duplication of the control permission, the control permission is assigned a unique identifier (hereinafter, referred to as a control permission ID). For example, the control permission issuance part 30 may assign a serial number as the control permission ID and increment the serial number each time the control permission is issued. Alternatively, the control permission issuance part 30 may use a time stamp representing an issue date and time as the control permission ID. According to the present embodiment, a 2-byte control permission ID in a range of 0x0001 to 0xFFFF is used as an example.

The control permission management part 31 records the control permission ID of the control permission newly issued in step S41 into the memory as information on a valid control permission (step S42). Subsequently, only the latest control permission ID recorded in the memory in step S42 is treated as "valid control permission", and all other control permission IDs are treated as "invalid control permission". With such a mechanism, control permission management is executed such that only one of already-issued control permissions is treated as valid, and the other control permissions are treated as invalid.

The control permission issuance part 30 returns the control permission ID of the control permission newly issued in step S41 to the control device (master) that has sent the control permission issuance request (step S43). With the master-slave communication, it is possible to transmit the control permission ID to the master by setting the control permission ID to a corresponding area of the frame received in step S40.

Then, the control permission issuance process comes to an end. The control permission issuance process shown in FIG. 4 is executed each time the subject device receives the "control permission issuance request" from the control device. Note that the processes of steps S42 and S43 may be executed in reverse order or in parallel.

Figure 5:
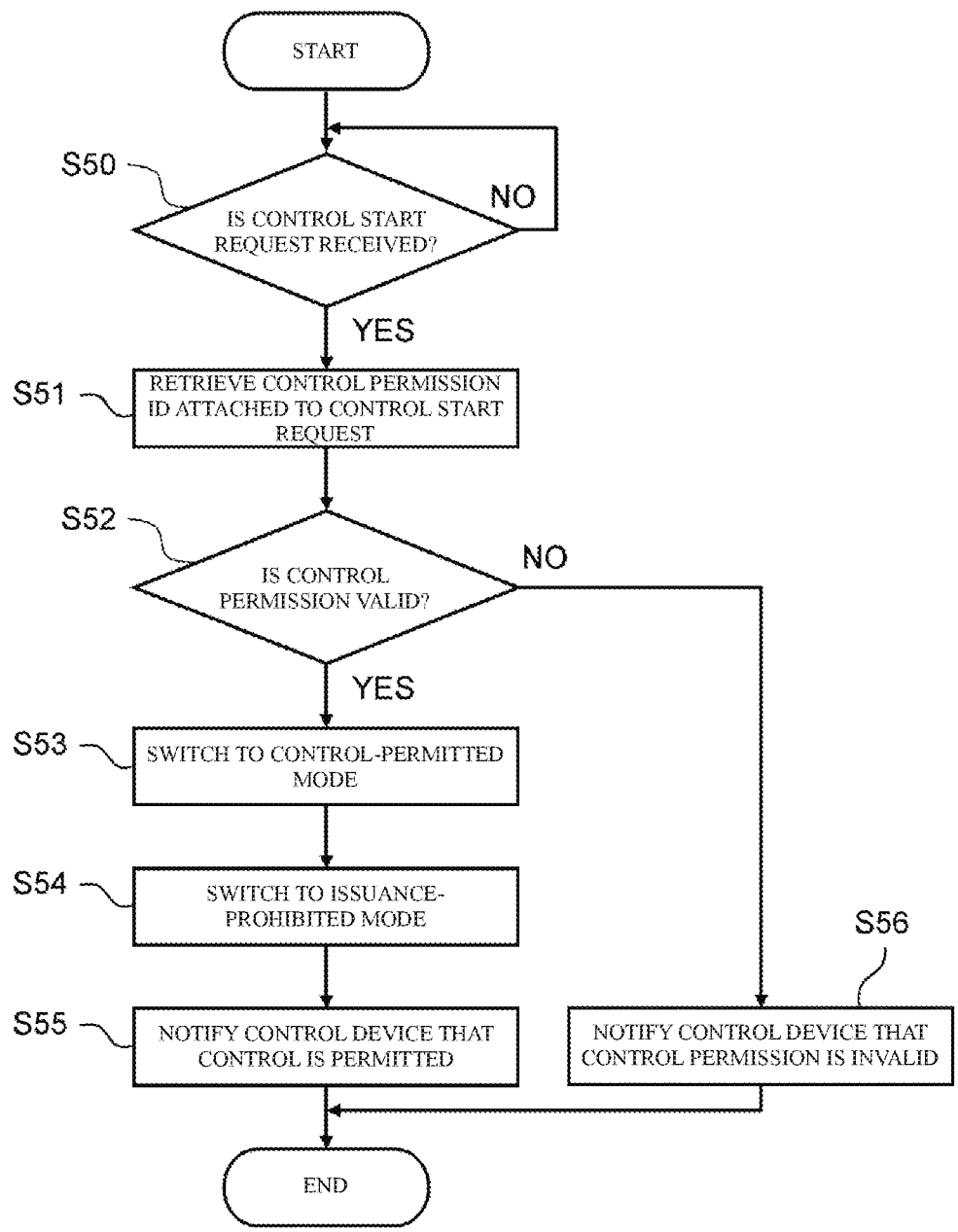
FIG. 5 is a flowchart showing a mutual exclusion process.

FIG. 5 is a flowchart showing a mutual exclusion process executed by the mutual exclusion part 32. The control device (master) that has acquired the control permission through the processes shown in FIG. 4 can issue a "control start request" to the subject device (slave). Specifically, the control device generates a frame representing the control start request addressed to the subject device and sends the frame to the network. At this time, the control permission ID acquired from the subject device is attached to the control start request. That is, the control permission ID also has a role of a certificate that certifies the control start request. An occupation period (for example, a control start time and end time) may be additionally attached to the control start request.

Upon receiving the "control start request" from any control device (master) over the network (step S50), the mutual exclusion part 32 of the subject device retrieves the control permission ID attached to the control start request (step S51). The mutual exclusion part 32 compares this control permission ID with the valid control permission ID stored in the memory to determine the validity of the control permission ID attached to the control start request (step S52).

When the control permission is valid, the mutual exclusion part 32 switches a mode of the subject device to a control-permitted mode (step S53) and an issuance-prohibited mode in which the control permission issuance part 30 does not issue a new control permission (step S54). Then, the mutual exclusion part 32 returns notification that the subject device has been brought into a control-permitted state to the control device (master) that has sent the control start request (step S55). This permits the control device to exclusively control the subject device. Note that the issuance-prohibited mode is cancelled when the exclusive control by the control device is terminated.

On the other hand, when the control permission attached to the control start request is invalid, the mutual exclusion part 32 returns notification that the control permission is invalid to the control device (master) that has sent the control start request. (step S56). This rejects exclusive control on the subject device by the control device. In a period between the acquisition of the control permission and the sending of the control start request by the control device, when a different control device issues the control permission issuance request, the control permission is transferred to the different control device, thereby causing a situation like S56.

(Specific Example of Mutual Exclusion)

Figure 6:
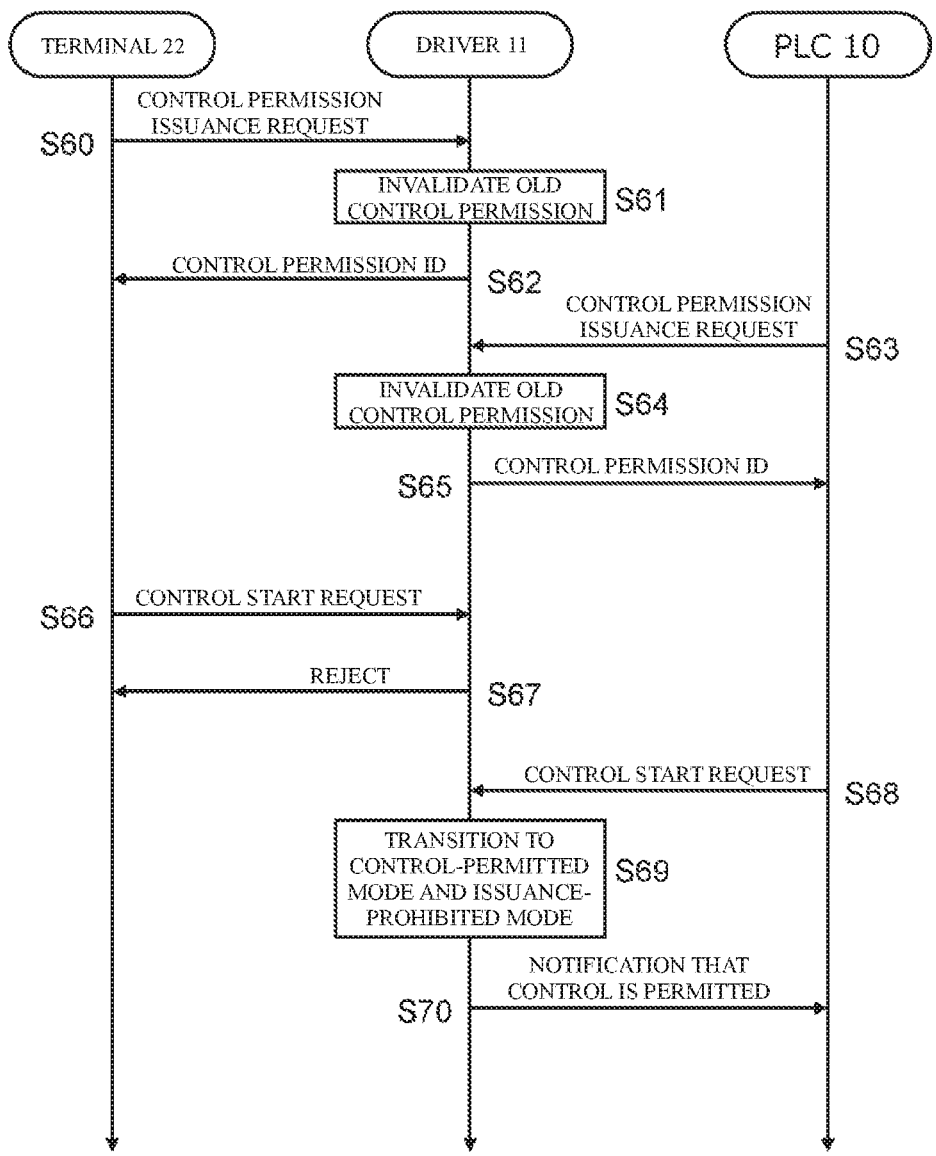
FIG. 6 is a diagram showing an example of mutual exclusion when a plurality of control devices are present.

With reference to FIG. 2B and FIG. 6, a description will be given of an example of mutual exclusion that is executed when the plurality of control devices try to control the same subject device.

When a person in charge of maintenance operates the terminal 22 to perform a test run of the driver 11, the terminal 22 sends the "control permission issuance request" to the driver 11 (step S60). The driver 11 issues a new control permission to the terminal 22 and invalidates the already-issued control permission (steps S61 and S62).

Subsequently, when the PLC 10 also sends the "control permission issuance request" to the driver 11 (step S63), the driver 11 issues a new control permission to the PLC 10 and invalidates the already-issued control permission. (steps S64 and S65). This causes the control permission to be transferred from the terminal 22 to the PLC 10.

Then, even when the terminal 22 sends the "control start request" to the driver 11 (step S66), the start of control is rejected because the control permission is invalid (step S67). In this case, the terminal 22 may display an error message such as "the test run of the subject device cannot be performed because of collision with another master". Such notification allows the person in charge of maintenance to know the fact that two or more masters are present and the cause of the test run failure.

Subsequently, when the PLC 10 sends the "control start request" to the driver 11 (step 68), the driver 11 transitions to the control-permitted mode and issuance-prohibited mode (step S69), and the driver 11 notifies the PLC 10 that the driver 11 is in the control-permitted state. (step S70). Thereafter, exclusive control is executed by the PLC 10 (not shown). While the exclusive control by the PLC 10 is in execution, the control permission ID may be attached to all messages sent from the PLC 10 to the driver 11. This allows the driver 11 to always check that the message is from the control device (in this example, the PLC 10) permitted to execute exclusive control and in turn to reliably reject the control command and the like from a different control device.

Advantages of the Present Embodiment

With the above-described configuration, even when a plurality of control devices are present on the network and individually and randomly (that is, without any arbitration between the control devices) send the control permission issuance request or the control start request to the subject device, it is guaranteed that only one control device having the valid control permission is permitted to control the subject device. This allows mutual exclusion on the subject device. Further, the method according to the present invention is applicable without the need for a control device side (a side that sends the control command) to check for the presence or absence of other control devices or to make arbitration with the other control devices and irrespective of the number of control devices or network topology, and thus the method has the advantage of implementing, in a simple manner, mutual exclusion in the subject device.

Further, it is possible to implement management of validity/invalidity of the control permission with very simple logic in which the other control permission is invalidated each time a new control permission is issued. Further, this configuration causes, even when the control device does not exercise the control permission (send the control start request) for some reason after acquiring the control permission, the control permission to be automatically invalidated (if the control permission issuance request is made by any other control device). That is, a mechanism is implemented where a control permission that becomes stale without being exercised automatically times out. Therefore, it is possible to prevent the occurrence of a situation where the control permission remains held by a certain control device (requests from other control devices are rejected). Furthermore, it is possible to guarantee the fairness among the control devices in that a control device that has acquired the control permission most recently can exercise the control permission preferentially.

Note that the description of the above embodiment is merely an illustrative example of the present invention. The present invention is not limited to the above specific embodiment, and various modifications can be made within the scope of the technical idea of the present invention. For example, in the above embodiment, the FA control system has been illustrated, but the present invention is applicable to any control system including the control device and the subject device. Further, even in the case of the FA control system, the present invention is applicable to networks other than EtherCAT, and the communication system between the control device and the subject device need not be the master-slave system.

The control permission management part 31 may set a limit on a period in which the control permission remains valid (effective time). For example, when not receiving the control start request, after issuing the control permission to a certain control device, from the control device within a predetermined effective time, the control permission management part 31 may invalidate the control permission given to the control device (irrespective of whether the control permission issuance request has been issued from any other control device). Further, the mutual exclusion part 32 may set a restriction time on the control-permitted mode and issuance-prohibited mode. For example, when not receiving any action from the control device within a predetermined restriction time after the mode of the subject device is switched to the control-permitted mode and issuance-prohibited mode, the mutual exclusion part 32 may invalidate the control permission given to the control device and automatically exit from the control-permitted mode and issuance-prohibited mode. Setting such an effective time or restriction time makes it possible to reliably prevent the occurrence of a deadlock where the control permission remains held by a certain control device (requests from other control devices are rejected).

REFERENCE SIGNS LIST 1 control system
10 PLC
11 driver
12 motor
20 PLC
21 hub
22 terminal
23 terminal
30 control permission issuance part
31 control permission management part
32 mutual exclusion part

The invention claimed is:
1. A control system comprising:
a subject device to be controlled; and
a plurality of control devices connected to the subject device over a network, characterized in that:
the subject device includes
a control permission issuance part configured to issue a new control permission each time a control permission issuance request is received from any of the plurality of control devices and return information on the new control permission to the control device that has sent the control permission issuance request,
a control permission management part configured to execute control permission management to validate only one of already-issued control permissions and invalidate a remaining control permission,
a mutual exclusion part configured to, upon receiving a control start request to which information on a control permission is attached from any of the plurality of control devices, check whether the control permission attached to the control start request is valid, permit, when the control permission is valid, exclusive control by the control device that has sent the control start request, and reject, when the control permission is invalid, control by the control device that has sent the control start request, and
the control permission management part of the subject device executes the control permission management to validate only a latest control permission of the already-issued control permissions and invalidate a control permission issued before the latest control permission.

2. The control system according to claim 1, wherein with the exclusive control by any of the control devices permitted, the control permission issuance part of the subject device does not issue a new control permission until the exclusive control by the control device is terminated.

3. The control system according to claim 1, wherein with the exclusive control by any of the control devices permitted, while the exclusive control by the control device is in execution, the information on the control permission issued to the control device is attached to a message sent from the control device to the subject device.

4. The control system according to claim 1, wherein
the subject device is a driver configured to drive an actuator, and
the control device is a PLC or a computer configured to send a control command to the driver.

5. The control system according to claim 1, wherein the network is an industrial network.

6. A mutual exclusion method implemented in a control system including a subject device to be controlled, and a plurality of control devices connected to the subject device over a network, the mutual exclusion method characterized in that:
causing the subject device to issue a new control permission each time a control permission issuance request is received from any of the plurality of control devices and return information on the new control permission to the control device that has sent the control permission issuance request;
causing the subject device to execute control permission management to validate only one of already-issued control permissions and invalidate a remaining control permission;
causing the subject device to, upon receiving a control start request to which information on a control permission is attached from any of the plurality of control devices, check whether the control permission attached to the control start request is valid, permit, when the control permission is valid, exclusive control by the control device that has sent the control start request, and reject, when the control permission is invalid, control by the control device that has sent the control start request; and causing the subject device to execute the control permission management to validate only a latest control permission of the already-issued control permissions and invalidate a control permission issued before the latest control permission.

7. A subject device that operates in accordance with a control command from a control device and to which a plurality of the control devices are connected over a network, the subject device characterized in that:

a control permission issuance part configured to issue a new control permission each time a control permission issuance request is received from any of the plurality of control devices and return information on the new control permission to the control device that has sent the control permission issuance request;

a control permission management part configured to execute control permission management to validate only one of already-issued control permissions and invalidate a remaining control permission;

a mutual exclusion part configured to, upon receiving a control start request to which information on a control permission is attached from any of the plurality of control devices, check whether the control permission attached to the control start request is valid, permit, when the control permission is valid, exclusive control by the control device that has sent the control start request, and reject, when the control permission is invalid, control by the control device that has sent the control start request; and the control permission management part executes the control permission management to validate only a latest control permission of the already-issued control permissions and invalidate a control permission issued before the latest control permission.

* * * * *